United States Patent
Jang et al.

(10) Patent No.: US 11,313,429 B2
(45) Date of Patent: Apr. 26, 2022

(54) PISTON FOR MAGNETO-RHEOLOGICAL DAMPER

(71) Applicant: NEW MOTECH CO., LTD., Gwangju (KR)

(72) Inventors: Jeong Cheol Jang, Gwangju (KR); Ji Min Lee, Gwangju (KR); Hyo Bin Lim, Gwangju (KR); Pan Guk Park, Naju-si (KR)

(73) Assignee: NEW MOTECH CO., LTD., Gwangju (KR)

( * ) Notice: Subject to any disclaimer, the term of this patent is extended or adjusted under 35 U.S.C. 154(b) by 37 days.

(21) Appl. No.: 17/050,459

(22) PCT Filed: Apr. 8, 2019

(86) PCT No.: PCT/KR2019/004156
§ 371 (c)(1),
(2) Date: Oct. 26, 2020

(87) PCT Pub. No.: WO2020/009315
PCT Pub. Date: Jan. 9, 2020

(65) Prior Publication Data
US 2021/0239179 A1    Aug. 5, 2021

(30) Foreign Application Priority Data
Jul. 3, 2018  (KR) .................. 10-2018-0076844

(51) Int. Cl.
*F16F 9/53* (2006.01)
*F16F 9/32* (2006.01)

(52) U.S. Cl.
CPC ............ *F16F 9/535* (2013.01); *F16F 9/3214* (2013.01); *F16F 2222/06* (2013.01); *F16F 2222/12* (2013.01); *F16F 2224/045* (2013.01)

(58) Field of Classification Search
CPC ...... F16F 9/535; F16F 9/3214; F16F 2222/06; F16F 2222/12; F16F 2224/045
See application file for complete search history.

(56) References Cited

U.S. PATENT DOCUMENTS 5,277,281 A  *  1/1994  Carlson ................ F16F 9/535
                                                   188/267
5,284,330 A  *  2/1994  Carlson ................ F16F 9/535
                                                   188/267.2
(Continued)

FOREIGN PATENT DOCUMENTS

CN       105932848 A     9/2016
JP       2009-535594 A   10/2009
(Continued)

OTHER PUBLICATIONS

International Search Report for PCT/KR2019/004156 dated Jul. 4, 2019 from Korean Intellectual Property Office.

*Primary Examiner* — Robert A. Siconolfi
*Assistant Examiner* — James K Hsiao
(74) *Attorney, Agent, or Firm* — Revolution IP, PLLC

(57) ABSTRACT

A piston for a magneto-rheological (MR) damper includes an upper core 11 having a side opening 113; a lower core 12 having a lower core body 121 and a central protrusion 122 protruding upwardly from the lower core body 121; and a magnetic field generator 13 coupled to the central protrusion 122, including a body 131A around which a coil 132 is wound, a ring-shaped upper support 131B extending from the upper portion of the body 131A in the radial direction, and a ring-shaped lower support 131C extending from the lower portion of the body 131A in the radial direction.

1 Claim, 6 Drawing Sheets

(56) References Cited

U.S. PATENT DOCUMENTS

| | | | | |
|---|---|---|---|---|
| 5,878,851 A * | 3/1999 | Carlson | ................... | F16F 9/362 |
| | | | | 188/269 |
| 6,311,810 B1 * | 11/2001 | Hopkins | ................ | F16F 9/535 |
| | | | | 188/267.2 |
| 6,336,535 B1 * | 1/2002 | Lisenker | ................ | F16F 9/535 |
| | | | | 188/267 |
| 6,390,252 B1 * | 5/2002 | Namuduri | ............... | F16F 9/535 |
| | | | | 188/267 |
| 7,413,063 B1 * | 8/2008 | Davis | .................... | B60G 17/06 |
| | | | | 188/267.1 |
| 7,849,983 B2 * | 12/2010 | St. Clair | ................ | F16F 9/064 |
| | | | | 188/267.1 |
| 8,327,984 B2 * | 12/2012 | Foister | ................... | F16F 9/535 |
| | | | | 188/267.2 |
| 8,430,416 B2 * | 4/2013 | Battlogg | ................... | F16F 9/34 |
| | | | | 280/284 |
| 9,273,751 B2 * | 3/2016 | Setty | ................... | F16F 13/305 |
| 9,482,304 B2 * | 11/2016 | Battlogg | ............... | F16F 9/3214 |
| 9,689,456 B2 * | 6/2017 | Saito | ................... | F16F 9/3214 |
| 9,797,465 B2 * | 10/2017 | Saito | ................... | F16F 9/3214 |
| 9,879,746 B2 * | 1/2018 | Keil | ....................... | F16F 9/3271 |
| 9,954,421 B2 * | 4/2018 | Roos | ......................... | F16D 1/06 |
| 10,166,832 B2 * | 1/2019 | DeBruler | ............... | B60G 15/12 |
| 10,211,695 B2 * | 2/2019 | Roos | ......................... | H02K 3/522 |
| 10,476,341 B2 * | 11/2019 | Pondelek | ............ | F16H 61/0006 |
| 10,588,233 B2 * | 3/2020 | Dunaway | ............... | F16F 9/3242 |
| 11,101,718 B2 * | 8/2021 | Heo | ..................... | H02K 11/215 |
| 2002/0130001 A1 * | 9/2002 | Lisenker | ................ | F16F 9/535 |
| | | | | 188/267.2 |
| 2002/0130003 A1 * | 9/2002 | Lisenker | ................. | F16F 9/535 |
| | | | | 188/267.2 |
| 2002/0162713 A1 * | 11/2002 | Lisenker | ............... | B24B 21/004 |
| | | | | 188/267.2 |
| 2003/0029683 A1 * | 2/2003 | Oliver | .................... | F16F 9/535 |
| | | | | 188/267.2 |
| 2004/0118646 A1 * | 6/2004 | Lun | ......................... | F16F 9/535 |
| | | | | 188/267 |
| 2004/0134728 A1 * | 7/2004 | Lisenker | ................. | F16F 9/342 |
| | | | | 188/267.2 |
| 2004/0154524 A1 * | 8/2004 | Fedders | .................. | B63B 29/06 |
| | | | | 114/363 |
| 2005/0126164 A1 * | 6/2005 | Kos | ......................... | F16F 9/463 |
| | | | | 60/326 |
| 2007/0257408 A1 | 11/2007 | St.Clair et al. | | |
| 2010/0109276 A1 * | 5/2010 | Marjoram | ............... | F16F 9/362 |
| | | | | 280/124.157 |
| 2012/0292143 A1 * | 11/2012 | Anderfaas | ............... | F16F 9/537 |
| | | | | 188/267.2 |
| 2015/0211596 A1 * | 7/2015 | Battlogg | ................ | H01F 41/06 |
| | | | | 188/267.2 |
| 2016/0254719 A1 | 9/2016 | Pondelek et al. | | |
| 2016/0261161 A1 | 9/2016 | Roos | | |

FOREIGN PATENT DOCUMENTS

| | | |
|---|---|---|
| KR | 10-0578176 B1 | 5/2006 |
| KR | 10-0947642 B1 | 3/2010 |
| KR | 10-2012-0129580 A | 11/2012 |
| KR | 10-1199598 B1 | 11/2012 |
| KR | 10-1686113 B1 | 12/2016 |

* cited by examiner

[Fig. 1]
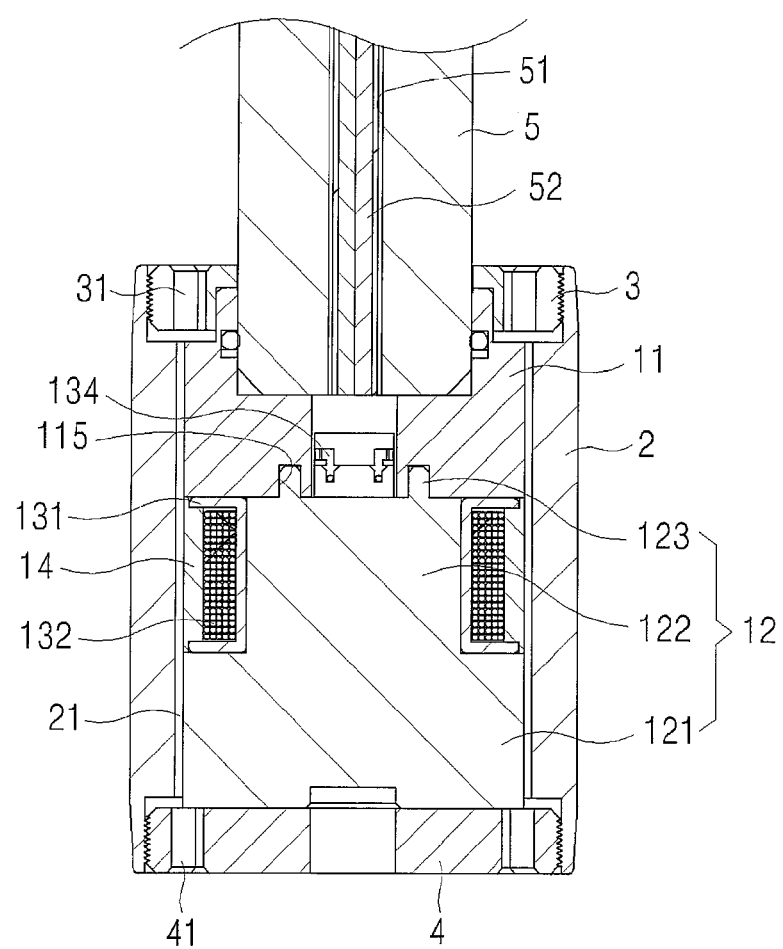

[Fig. 2]
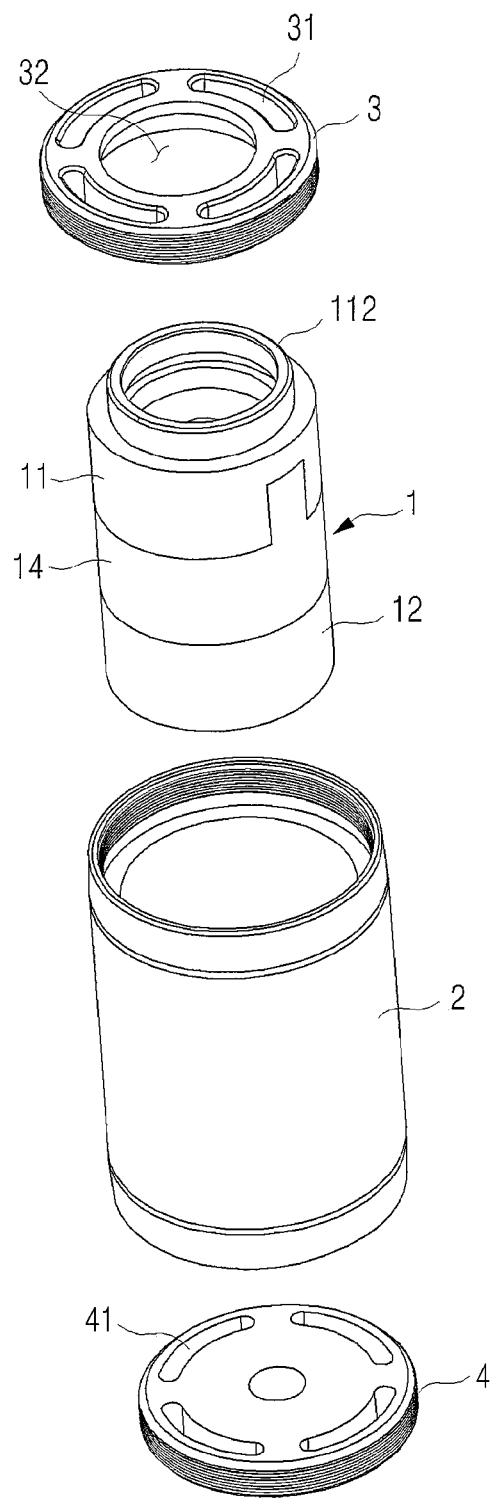

[Fig. 3]
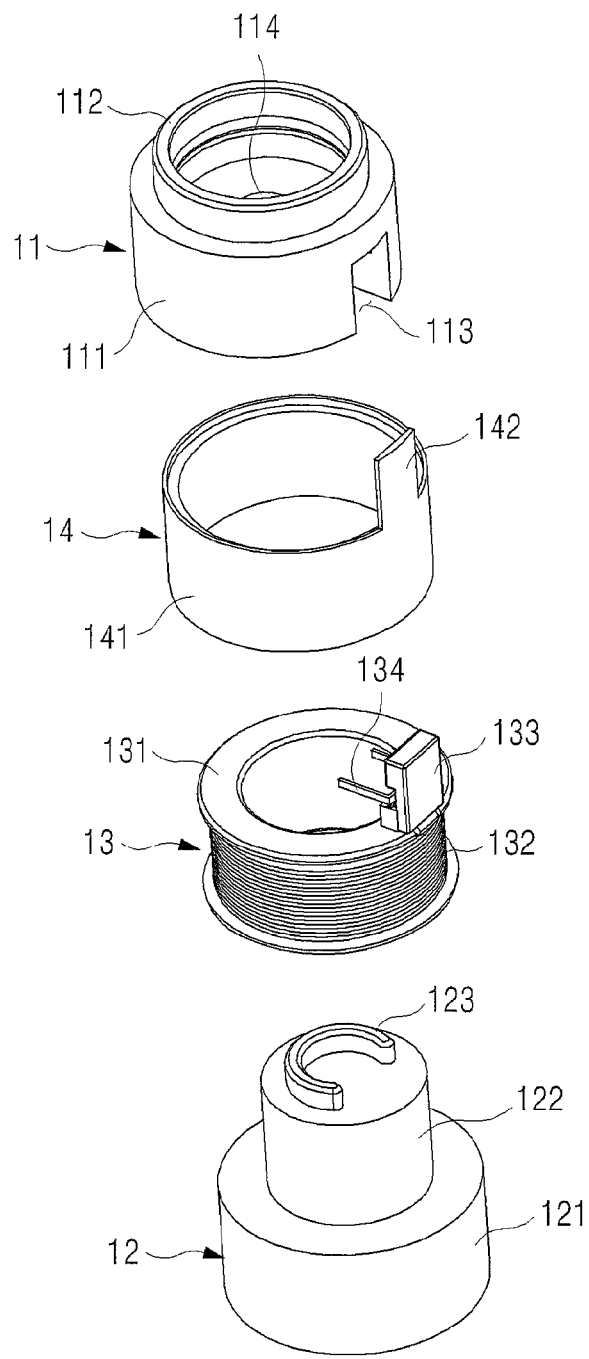

[Fig. 4]
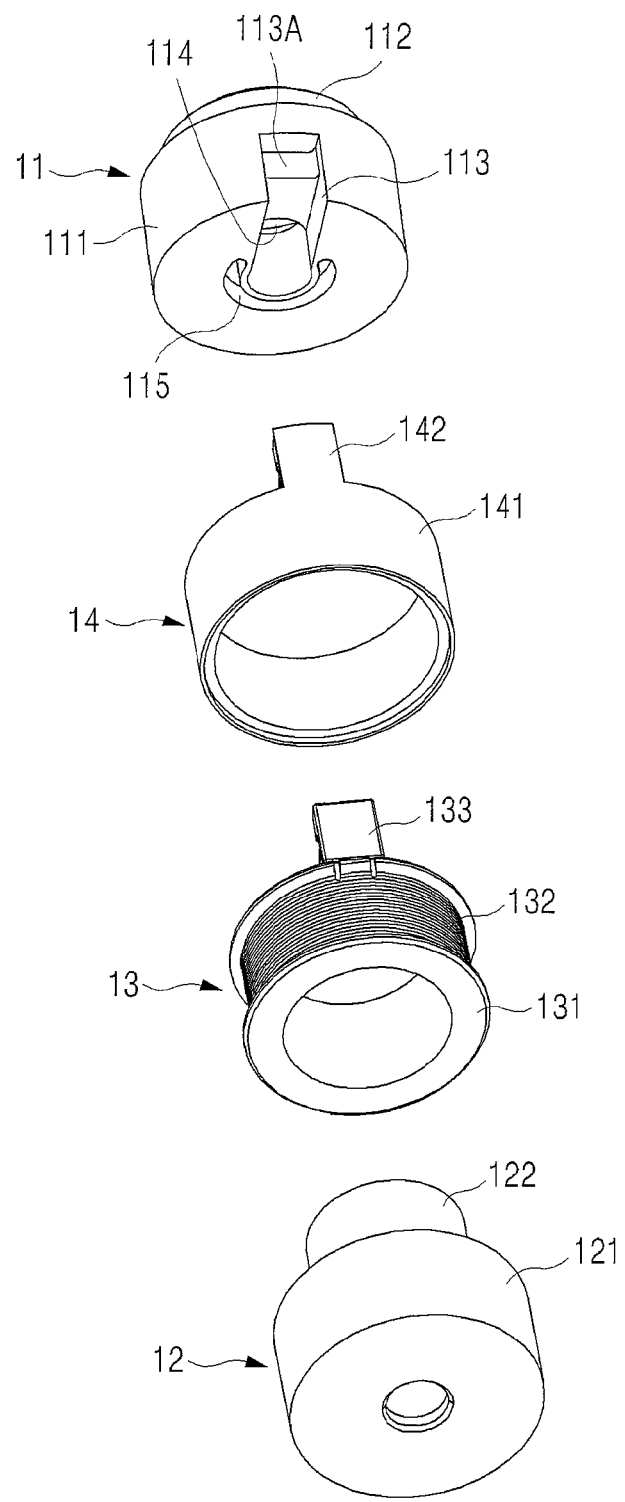

[Fig. 5]
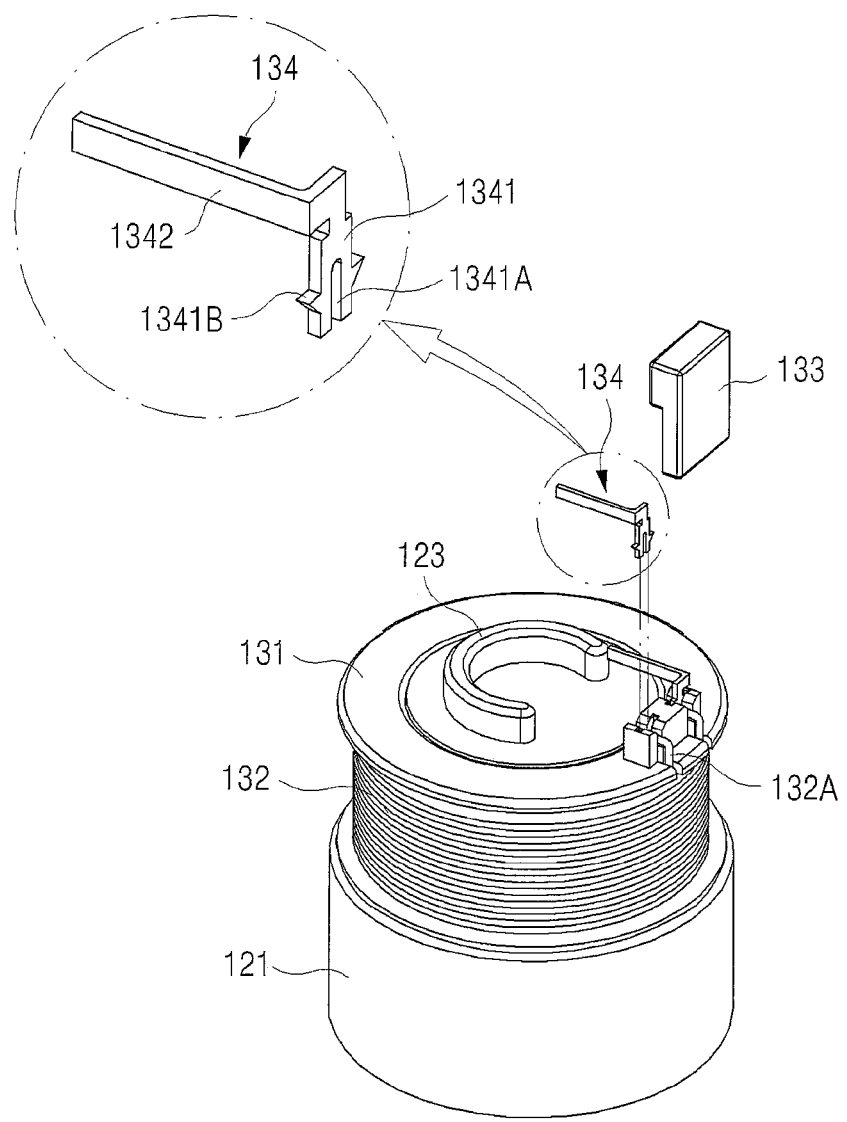

[Fig. 6]
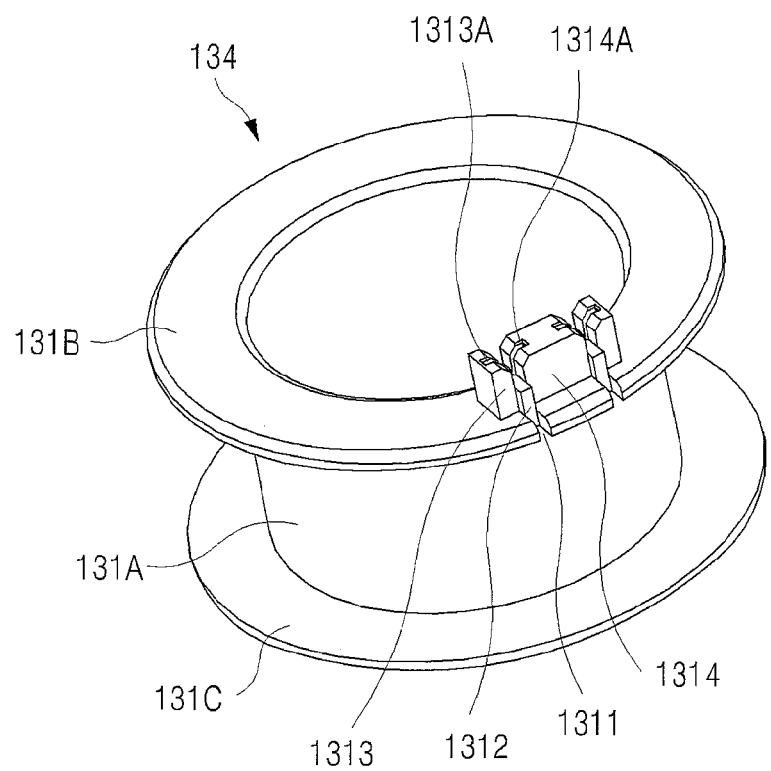

PISTON FOR MAGNETO-RHEOLOGICAL DAMPER

TECHNICAL FIELD

The present invention relates to a piston for a magneto-rheological (MR) damper. More specifically, the present invention relates to a piston for an MR damper in which a core of the piston for generating a magnetic field is designed to be separable in the MR damper, thereby facilitating the assembling of the piston and facilitating the operation of electrical connection between a coil and a lead wire.

BACKGROUND ART

In general, a damper, which is a vibration absorber, is used in the suspension system of vehicles or rails, and is employed in household electrical appliances generating vibration such as washing machines, buildings, structures, etc., to reduce vibration from the outside. There are various types of dampers, and recently a magneto-rheological (MR) damper using magneto-rheological fluid is used. An MR damper includes a cylinder filled with MR fluid and a piston disposed within the cylinder. The piston has a magnetic circuit that generates a magnetic field by a control signal and controls the viscosity of the MR fluid to reduce vibration.

DISCLOSURE OF INVENTION

Technical Problem

Korean Patent Laid-Open No. 10-2012-0129580 discloses the structure of a magnetic circuit in which a coil is wound around a ferromagnetic core to generate a magnetic field. Korean Patent No. 10-1686113 discloses an MR damper of a structure in which a bypass hole is formed in a magnetic core.

According to the aforementioned prior art documents, a core, which is a magnetic body that forms a magnetic circuit, is configured as one member, allowing only a restricted space for connection between a lead wire and the end of a coil wound around the core and thus leading to difficult operation, thereby lowering assemblability and productivity of a piston.

The inventors of the present invention suggest an MR damper of a novel structure in order to solve the aforementioned problems.

Solution to Problem

It is an object of the present invention to provide a piston for an MR damper which improves assemblability.

It is another object of the present invention to provide a piston for an MR damper which facilitates electrical connection of a magnetic circuit.

The above objects of the present invention and other inherent objects could be easily achieved by the present invention explained in the following.

The piston for a magneto-rheological (MR) damper according to the present invention comprises an upper core 11 having a side opening 113; a lower core 12 having a lower core body 121 and a central protrusion 122 protruding upwardly from the lower core body 121; and a magnetic field generator 13 including an insulator 131 coupled to the central protrusion 122, wherein the insulator includes a body 131A around which a coil 132 is wound, a ring-shaped upper support 131B extending from the upper portion of the body 131A in the radial direction, and a ring-shaped lower support 131C extending from the lower portion of the body 131A in the radial direction.

In the present invention, preferably, a coil inlet 1311 is formed in the upper support 131B of the insulator 131, through which the end of the coil 132 passes.

In the present invention, the piston for the MR damper may further comprise a lower coil guide 1312 formed from the coil inlet 1311, protruding upwardly from the upper support 131B; a first side coil guide 1313 formed at one side of the lower coil guide 1312; and a second side coil guide 1314 formed at the other side of the lower coil guide 1312.

In the present invention, first and second terminal insertion grooves 1313A, 1314A may be formed in the first and second side coil guides 1313, 1314, respectively.

In the present invention, preferably, the piston for the MR damper further comprises a coil connection terminal 134 including a terminal insert 1341 and a lead wire connector 1342, wherein a coil press-fitted groove 1341A into which the end of the coil 132 is inserted is formed in the terminal insert 1341, and the terminal insert 1341 is inserted into the first and second terminal insertion grooves 1313A, 1314A.

Advantageous Effects of Invention

The present invention has the effect of providing a piston for an MR damper which improves assemblability and facilitates electrical connection of a magnetic circuit.

BRIEF DESCRIPTION OF DRAWINGS

FIG. 1 is a cross-sectional view illustrating a piston for an MR damper according to the present invention;

FIG. 2 is an exploded perspective view illustrating the piston for the MR damper according to the present invention;

FIG. 3 is an exploded perspective view illustrating a core assembly of the piston for the MR damper according to the present invention;

FIG. 4 is an exploded bottom perspective view illustrating the core assembly of the piston for the MR damper according to the present invention;

FIG. 5 is a perspective view illustrating a portion of the core assembly of the piston for the MR damper according to the present invention; and FIG. 6 is a perspective view illustrating an insulator used in the core assembly of the piston for the MR damper according to the present invention.

Hereinafter, the present invention will be explained in more detail with reference to the accompanied drawings.

MODE FOR THE INVENTION

FIG. 1 is a cross-sectional view illustrating a piston for an MR damper according to the present invention, and FIG. 2 is an exploded perspective view illustrating the piston for the MR damper according to the present invention.

As illustrated in FIG. 1 and FIG. 2, the piston for the MR damper according to the present invention includes a core assembly 1, a housing 2, an upper cover 3 and a lower cover 4.

The core assembly 1 generates a magnetic field by the power supplied from a lead wire 52 and a control signal to control the viscosity of MR fluid. The core assembly 1 includes an upper core 11 and a lower core 12. The upper core 11 is a magnetic body. A piston rod 5 is coupled to the upper core 11, and the coupled surface is subjected to sealing treatment with an O-ring, etc., in order to prevent the fluid from flowing therein. The lower core 12 is a magnetic body having the structure of a lower core body 121 and a central protrusion 122. A coupling projection 123 protruding upwardly is formed in the central protrusion 122. The coupling projection 123 is inserted into a coupling groove 115 formed in the lower portion of the upper core 11.

An insulator 131 around which a coil 132 is wound is coupled to the central protrusion 122 of the lower core 12. The end of the coil 132 is electrically connected to a coil connection terminal 134 coupled to the upper portion of the insulator 131. The lead wire 52 is guided within the lower core 12 from the outside through a central passage 51 formed in the center of the piston rod 5 in the longitudinal direction, such that the lead wire 52 and the coil connection terminal 134 are electrically connected to each other. The outer circumferential surface of the coil 132 wound is surrounded by a covering mold 14.

The core assembly 1 is disposed within the housing 2. The upper cover 3 is coupled to the upper portion of the housing 2, and the lower cover 4 is coupled to the lower portion of the housing 2. A space between the inner wall of the housing 2 and the outer circumferential surface of the core assembly 1 is a fluid passage 21. The piston rod 5 passes through a central hole 32 of the upper cover 3 to be coupled to the inside of an upper protrusion 112 of the upper core 11. When the piston for the MR damper according to the present invention is disposed within a cylinder (not illustrated) filled with MR fluid, the piston moves up and down by external vibration. The MR fluid moves through fluid passages 21, 31, 41. Here, the viscosity of the MR fluid is controlled to be increased or decreased by a magnetic field generated from the core assembly 1, and thereby vibration can be reduced.

FIG. 3 is an exploded perspective view illustrating the core assembly 1 of the piston for the MR damper according to the present invention, and FIG. 4 is an exploded bottom perspective view illustrating the core assembly 1. Referring to FIG. 3 and FIG. 4 together, the core assembly 1 of the present invention includes an upper core 11, a lower core 12, a magnetic field generator 13 and a covering mold 14.

The upper core 11 is a magnetic body including a cylindrical upper core body 111, a ring-shaped upper protrusion 112 protruding upwardly from the upper core body 111, an open-shaped side opening 113 at the lower side surface of the upper core body 111, and a central hole 114 formed in the center of the upper core body 111 for the lead wire 52 to pass through. A stopper 113A is formed inside the side opening 113 to prevent a protection member 133 from being introduced into the inside of the core assembly 1 when the covering mold 14 is formed by insert injection molding.

The lower core 12 is a magnetic body including a cylindrical lower core body 121, a cylindrical central protrusion 122 protruding upwardly from the center of the lower core body 121, and a coupling projection 123 protruding upwardly from the upper portion of the central protrusion 122. The coupling projection 123 is inserted into the coupling groove 115 formed in the lower portion of the upper core 11.

The magnetic field generator 13 includes an insulator 131 around which a coil 132 is wound in the radial direction. The insulator 131 is made of an insulating material. The coil connection terminal 134 electrically connected to the end of the coil 132 is coupled to the upper portion of the insulator 131. The insulator 131 is installed in the central protrusion 122 of the lower core 12. The protection member 133 is disposed outside the coil connection terminal 134 in the radial direction and disposed in the opened portion of the side opening 113 in the radial direction, to protect the coil connection terminal 134. Particularly, the protection member 133 prevents a mold for injection or the protection member 133 by pressure of the mold for injection from being introduced into the inside of the upper and lower cores 11, 12 when the covering mold 14 is formed by insert injection molding.

The covering mold 14, the portion covering the outer circumferential surface of the magnetic field generator 13, is preferably manufactured by insert injection molding which locates the upper core 11, lower core 12 and magnetic field generator 13 coupled to each other in an insert injection mold, followed by injection molding of a plastic mold. As described above, upon insert injection molding while the protection member 133 is disposed in the side opening 113, it is possible to prevent an injection molded product from being introduced into the inside of the upper and lower cores 11, 12. The protection member 133 is positioned to cover the entrance of the side opening 113 formed in the upper core body 111 of the upper core 11. When the covering mold 14 is formed by insert injection molding, the covering mold 14 is formed to include a side cover 141 covering the outer circumferential surface of the magnetic field generator 13 and an opening cover 142 formed at the side of the outer surface of the protection member 133 in the side opening 113 in the radial direction.

FIG. 5 is a perspective view illustrating a portion of the core assembly 1 of the piston for the MR damper according to the present invention, and FIG. 6 is a perspective view illustrating the insulator 131 used in the core assembly 1. Referring to FIG. 5 and FIG. 6 together, the electrical connection structure of the magnetic field generator 13 of the present invention is described along with the structure of the insulator 131 as follows.

Referring to FIG. 6, the insulator 131 used in the magnetic field generator 13 of the present invention includes a cylindrical body 131A, a ring-shaped upper support 131B extending from the upper portion of the body 131A in the radial direction, and a ring-shaped lower support 131C extending from the lower portion of the body 131A in the radial direction. Around the body 131A, the coil 132 is wound and inside the body 131A, the central protrusion 122 is inserted. The end 132A of the wound coil passes through a coil inlet 1311 formed in the upper support 131B and is placed on a lower coil guide 1312 formed from the coil inlet 1311, protruding upwardly from the upper support 131B. A first side coil guide 1313 is disposed at one side of the lower coil guide 1312, and a second side coil guide 1314 is disposed at the other side of the lower coil guide 1312. The first and second side coil guides 1313, 1314 guide the end 132A of the coil 132 to be placed on the lower coil guide 1312. First and second terminal insertion grooves 1313A, 1314A are formed in the first and second side coil guides 1313, 1314, respectively.

Referring to FIG. 5, the coil connection terminal 134 includes a terminal insert 1341 and a lead wire connector 1342. The terminal insert 1341 is the portion into which the first terminal insertion groove 1313A and the second terminal insertion groove 1314A are inserted, and the coil connection terminal 134 is electrically connected with the end 132A of the coil 132. To this end, a coil press-fitted groove 1341A is formed in the lower side of the terminal insert 1341, and a coupling hook 1341B is formed in the side surface of the terminal insert 1341. Thus, when the terminal insert 1341 is inserted into the first terminal insertion groove 1313A and the second terminal insertion groove 1314A, the end 132A of the coil is press-fitted into the coil press-fitted groove 1341A to ensure electrical connection. The terminal insert 1341 is firmly coupled to the first terminal insertion groove 1313A and the second terminal insertion groove 1314A by the coupling hook 1341B. A connector (not illustrated), etc., at the end of the lead wire 52 is coupled to the lead wire connector 1342 for electrical connection. The protection member 133 may be disposed at the end 132A of the coil in the upper side of the coil inlet 1311.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A piston for a magneto-rheological (MR) damper, comprising:
    an upper core (11) having a side opening (113);
    a lower core (12) having a lower core body (121) and a central protrusion (122) protruding upwardly from the lower core body (121);
    a magnetic field generator (13) including an insulator (131) coupled to the central protrusion (122), the insulator including a body (131A) around which a coil (132) is wound, a ring-shaped upper support (131B) extending from the upper portion of the body (131A) in the radial direction, and a ring-shaped lower support (131C) extending from the lower portion of the body (131A) in the radial direction;
    a coil inlet (1311) formed in the upper support (131B) of the insulator (131), through which the end of the coil (132) passes;
    a lower coil guide (1312) formed from the coil inlet (1311), protruding upwardly from the upper support (131B);
    a first side coil guide (1313) formed at one side of the lower coil guide (1312);
    a second side coil guide (1314) formed at the other side of the lower coil guide (1312);
    first and second terminal insertion grooves (1313A, 1314A) formed in the first and second side coil guides (1313, 1314), respectively; and
    a coil connection terminal (134) including a terminal insert (1341) and a lead wire connector (1342), wherein a coil press-fitted groove (1341A) into which the end of the coil (132) is inserted is formed in the terminal insert (1341), and the terminal insert (1341) is inserted into the first and second terminal insertion grooves (1313A, 1314A).

* * * * *